US009092750B2

(12) United States Patent
Bournas

(10) Patent No.: US 9,092,750 B2
(45) Date of Patent: Jul. 28, 2015

(54) RAPIDLY OPTIMIZING STAFFING LEVELS IN A TICKETING SYSTEM USING SIMULATION

(71) Applicant: International Business Machines Corporation, Armonk, NY (US)

(72) Inventor: Redha M. Bournas, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 224 days.

(21) Appl. No.: 13/773,748

(22) Filed: Feb. 22, 2013

(65) Prior Publication Data

US 2014/0244331 A1  Aug. 28, 2014

(51) Int. Cl.
*G06Q 10/00* (2012.01)
*G06Q 10/06* (2012.01)

(52) U.S. Cl.
CPC .............. *G06Q 10/063116* (2013.01)

(58) Field of Classification Search
USPC ............... 705/7.11–7.42; 379/240–266
See application file for complete search history.

(56) References Cited

U.S. PATENT DOCUMENTS

| | | | | | |
|---|---|---|---|---|---|
| 5,111,391 | A | * | 5/1992 | Fields et al. | 705/7.14 |
| 5,185,780 | A | * | 2/1993 | Leggett | 379/265.08 |
| 5,890,134 | A | * | 3/1999 | Fox | 705/7.24 |
| 5,911,134 | A | * | 6/1999 | Castonguay et al. | 705/7.12 |
| 6,044,355 | A | * | 3/2000 | Crockett et al. | 705/7.39 |
| 6,278,978 | B1 | * | 8/2001 | Andre et al. | 705/7.13 |
| 6,578,005 | B1 | * | 6/2003 | Lesaint et al. | 705/7.14 |
| 6,587,831 | B1 | | 7/2003 | O'Brien | |
| 6,823,315 | B1 | * | 11/2004 | Bucci et al. | 705/7.16 |
| 6,952,732 | B2 | | 10/2005 | Nourbakhsh et al. | |
| 6,970,829 | B1 | * | 11/2005 | Leamon | 705/7.14 |
| 7,243,074 | B1 | * | 7/2007 | Pennisi, Jr. | 705/7.22 |
| 7,457,765 | B2 | * | 11/2008 | Thompson et al. | 705/7.14 |
| 7,480,913 | B2 | | 1/2009 | Buco et al. | |
| 7,499,869 | B2 | | 3/2009 | Iknoian | |
| 7,725,339 | B1 | | 5/2010 | Aykin | |
| 7,853,006 | B1 | * | 12/2010 | Fama et al. | 379/265.06 |
| 7,917,536 | B2 | * | 3/2011 | Lora et al. | 707/802 |
| 8,015,042 | B2 | * | 9/2011 | Seetharaman et al. | 705/7.12 |
| 8,027,849 | B2 | * | 9/2011 | Johnson et al. | 705/2 |
| 8,311,850 | B2 | * | 11/2012 | Johnson et al. | 705/2 |

(Continued)

OTHER PUBLICATIONS

Y. Diao and A. Heching, "Staffing optimization in complex service delivery systems," in Proceedings of 7th International Conference on Network and Service Management, Paris, France, 2011.*

(Continued)

*Primary Examiner* — Alan S Miller
(74) *Attorney, Agent, or Firm* — David B. Woycechowsky; Matthew Chung

(57) ABSTRACT

A method, system and software for determining a final staffing schedule by scheduling a plurality of staffing resource units (SRUs) into a plurality of shifts. The method includes the following steps (not necessarily in the following order except as explicitly indicated): (i) determining an initial staffing schedule; (ii) iteratively-adding SRUs to the staffing schedule until it is determined that the staffing schedule meets a feasibility condition; (iii) iteratively-subtracting SRUs from the staffing schedule until it is determined that the staffing schedule meets at least one improper condition; and (iv) subsequent to the subtracting step, adding a single SRU to the staffing schedule to yield the final staffing schedule.

17 Claims, 8 Drawing Sheets

(56) References Cited

U.S. PATENT DOCUMENTS

| | | | |
|---|---|---|---|
| 8,386,639 B1* | 2/2013 | Galvin | 709/238 |
| 8,583,467 B1* | 11/2013 | Morris et al. | 705/7.26 |
| 8,612,272 B1* | 12/2013 | Aykin | 705/7.11 |
| 8,799,008 B2* | 8/2014 | Johnson et al. | 705/2 |
| 8,874,456 B2* | 10/2014 | Lakritz et al. | 705/7.12 |
| 2001/0051888 A1* | 12/2001 | Mayhak et al. | 705/8 |
| 2002/0087377 A1* | 7/2002 | Rajasenan et al. | 705/7 |
| 2003/0065544 A1* | 4/2003 | Elzinga et al. | 705/8 |
| 2004/0010437 A1* | 1/2004 | Kiran et al. | 705/8 |
| 2004/0039628 A1* | 2/2004 | Thompson et al. | 705/9 |
| 2004/0107133 A1 | 6/2004 | Pantaleo et al. | |
| 2004/0181794 A1* | 9/2004 | Coleman et al. | 718/104 |
| 2004/0267591 A1 | 12/2004 | Hedlund et al. | |
| 2005/0004828 A1* | 1/2005 | deSilva et al. | 705/9 |
| 2005/0038689 A1 | 2/2005 | Shahoumian | |
| 2005/0080658 A1* | 4/2005 | Kohn et al. | 705/8 |
| 2005/0135600 A1* | 6/2005 | Whitman | 379/266.08 |
| 2005/0137925 A1* | 6/2005 | Lakritz et al. | 705/8 |
| 2005/0165930 A1* | 7/2005 | Whitman | 709/226 |
| 2006/0074740 A1 | 4/2006 | Garcia et al. | |
| 2006/0129687 A1* | 6/2006 | Goldszmidt et al. | 709/229 |
| 2006/0161884 A1* | 7/2006 | Lubrecht et al. | 717/104 |
| 2006/0177041 A1* | 8/2006 | Warner et al. | 379/266.08 |
| 2006/0259338 A1* | 11/2006 | Rodrigue et al. | 705/7 |
| 2006/0277090 A1 | 12/2006 | Bollenbeck et al. | |
| 2007/0179830 A1 | 8/2007 | Iknoian | |
| 2008/0103868 A1 | 5/2008 | Santos et al. | |
| 2008/0243575 A1* | 10/2008 | Weinberger | 705/8 |
| 2008/0300954 A1* | 12/2008 | Cameron et al. | 705/9 |
| 2009/0089092 A1* | 4/2009 | Johnson et al. | 705/2 |
| 2009/0132332 A1* | 5/2009 | Belenky et al. | 705/9 |
| 2010/0088138 A1 | 4/2010 | An et al. | |
| 2011/0077994 A1* | 3/2011 | Segev et al. | 705/9 |
| 2011/0153379 A1* | 6/2011 | Toba et al. | 705/7.14 |
| 2012/0087486 A1* | 4/2012 | Guerrero et al. | 379/265.02 |
| 2014/0108078 A1* | 4/2014 | Davis | 705/7.14 |
| 2014/0136260 A1* | 5/2014 | Dasgupta et al. | 705/7.17 |
| 2014/0244333 A1* | 8/2014 | Bournas | 705/7.16 |

OTHER PUBLICATIONS

Yixin Diao; Heching, A. "Closed loop performance management for service delivery systems", Network Operations and Management Symposium (NOMS), 2012 IEEE, on pp. 61-69.*

Prashanth, Lakshmanrao A., et al. "Stochastic optimization for adaptive labor staffing in service systems." Service-Oriented Computing. Springer Berlin Heidelberg, 2011. 487-494.*

Diao, Yixin, et al. "Modeling a complex global service delivery system." Simulation Conference (WSC), Proceedings of the 2011 Winter. IEEE, 2011.*

Prashanth, L. A., et al. "Simultaneous perturbation methods for adaptive labor staffing in service systems." arXiv preprint arXiv:1312. 7430 (2013).*

Ernst, Andreas T., et al. "Staff scheduling and rostering: A review of applications, methods and models." European journal of operational research 153.1 (2004): 3-27.*

Bean, James C., and Margaret H. Bean. "An integer programming approach to reference staff scheduling." Information processing & management 21.5 (1985): 459-464.*

Izady, Navid, and Dave Worthington. "Setting staffing requirements for time dependent queueing networks: The case of accident and emergency departments." European Journal of Operational Research 219.3 (2012): 531-540.*

Tsai, Chang-Chun, and Sherman Ha Li. "A two-stage modeling with genetic algorithms for the nurse scheduling problem." Expert Systems with Applications 36.5 (2009): 9506-9512.*

Jaumard, Brigitte, Frederic Semet, and Tsevi Vovor. "A generalized linear programming model for nurse scheduling." European journal of operational research 107.1 (1998): 1-18.*

Vanhoucke, Mario, and Broos Maenhout. "On the characterization and generation of nurse scheduling problem instances." European Journal of Operational Research 196.2 (2009): 457-467.*

Topaloglu, Seyda. "A shift scheduling model for employees with different seniority levels and an application in healthcare." European Journal of Operational Research 198.3 (2009): 943-957.*

Bournas, Redha M., Frederick J. Beutler, and Demosthenis Teneketzis. "Optimal flow control allocation policies in communication networks with priorities." Decision and Control, 1991., Proceedings of the 30th IEEE Conference on. IEEE, 1991.*

Bournas, Redha M., Frederick J. Beutler, and Demosthenis Teneketzis. "Optimal hop-by-hop flow control policies in computer networks with multiple transmitters: convexity and monotonicity properties. I. linear and equal holding costs." Decision and Control, 1990., Proceedings of the 29th IEEE Conference on. IEEE, 1990.*

Asgeirsson, Eyjólfur Ingi. "Bridging the gap between self schedules and feasible schedules in staff scheduling." Annals of Operations Research (2012): 1-19.*

Floudas et al., "Mixed Integer Linear Programming in Process Scheduling: Modeling, Algorithms, and Applications." Annals of Operations Research: 139, 131-162, 2005.

Alwadood et al. "Maintenance Workforce Scheduling Using Arena Simulation," Proceedings Second International Conference on Computer Research and Development (ICCRD 2010), pp. 517-21, May 2010, IEEE, Los Alamitos, CA, USA.

Atlason, et al. "Optimizing Call Center Staffing Using Simulation and Analytic Center Cutting Plane Methods", Cornell University School of Operations Research and Industrial Engineering, Technical Report Nos. 4-9, Aug. 4, 2004.

Berghe, Greet V. "An Advanced Model and Novel Meta-heuristic Solution Methods to Personnel Scheduling in Healthcare", 2002.

Robbins et al. "A Simulation Based Scheduling Model for Call Centers with Uncertain Arrival Rates," Proceedings of the 2008 Winter Simulation Conference, pp. 2884-2890, ©2008 IEEE.

Bournas, U.S. Appl. No. 13/927,268 filed Jun. 26, 2013, Non-Final Office Action dated Dec. 5, 2014.

Wang et al., "Service Level Agreement-Based Joint Application Environment Assignment and Resource Allocation in Cloud Computing Systems", 2013 IEEE Green Technologies Conference, Apr. 4-5, 2013, Denver, CO, pp. 167-174, doi: 10.1109/GreenTech.2013. 33.

\* cited by examiner

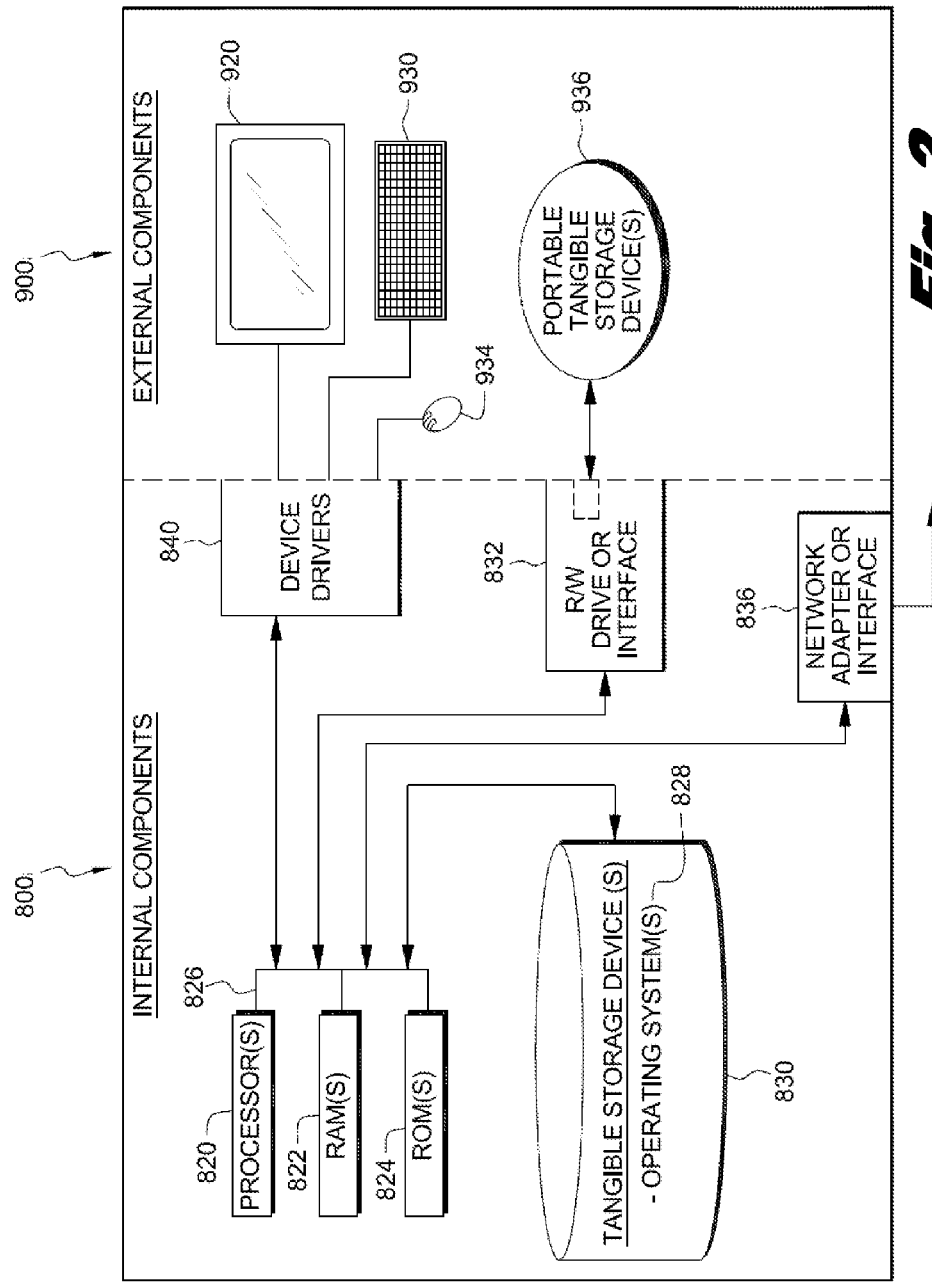

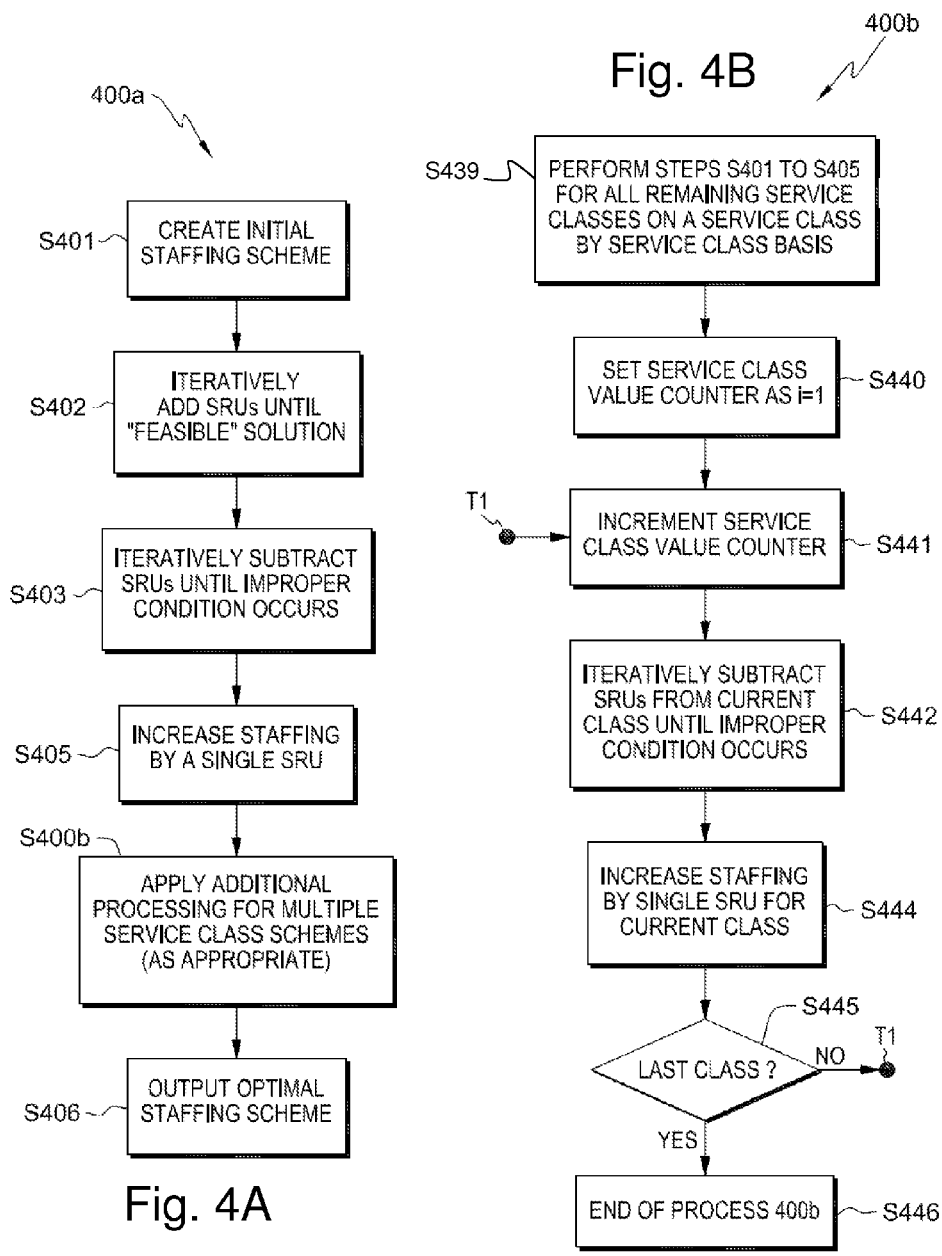

RAPIDLY OPTIMIZING STAFFING LEVELS IN A TICKETING SYSTEM USING SIMULATION

FIELD OF THE INVENTION

The present invention relates generally to the field of computerized determination of staffing levels, and more specifically to computerized determination of staffing levels in a ticketing system using computer simulation.

BACKGROUND OF THE INVENTION

It is known to use computer software to determine staffing types and/or levels. It is also known that some staffing issues are controlled, at least in part, by Service Level Agreements (SLAs) and that it is important to comply with the terms of the SLA(s) when staffing levels are determined. In the art of determining staffing levels, it is recognized that there are different Service Classes used to categorize resources (that is, generally human employees and/or human contractors). It is further known that in some situations an employee of a first Service Class may be able to perform tasks associated with a different service class. For example, a fully-registered, traditional "nurse" may be able to perform tasks associated with the Service Class of "nurse practitioner" (or, more correctly "licensed practical nurse"). As another example, a level 2 help desk person for computer and application support is qualified to handle level 1 and level 2 customer problems whereas a level 1 help desk person is only qualified to handle level 1 customer problems; level 2 problems are more severe than level 1 problems. It is known that a staffing issue may involve staffing for multiple shifts, locations, Service Classes and the like.

There are at least two different types of staffing situations: (i) staffing for ticketing systems; and (ii) staffing for call centers. Call centers and ticketing systems have different characteristics such as service time distribution. Another difference between ticketing system staffing and call center staffing is that call centers experience lost calls due to a limited (and controllable) number of communication lines, while, in a ticketing system, substantially all "tickets" are queued and eventually processed.

The following are known examples of resource allocation algorithms: (i) U.S. Pat. No. 7,480,913 ("913 Buco") (see, especially, column 11, line 53 to column 14, line 30 describing a greedy scheme, for task-based scheduling that implements locally optimal decisions); (ii) US patent application 2011/0077994 ("994 Segev") (describing an iterative method of staffing using simulation); and (iii) US patent application 2012/0087486 ("486 Guerrero") (resource allocation for call centers having a call center service time distribution and the possibility that calls that are lost when there aren't enough available phone lines).

SUMMARY

According to an aspect of the present invention, there is a method for at least partially determining a final staffing schedule by scheduling a plurality of staffing resource units (SRUs) into a plurality of shifts, the plurality of shifts having a preliminary or current staffing schedule including pluralities of SRUs assigned to the plurality of shifts, respectively. The method includes the following steps: (i) determining, by one or more processors, which shift of the plurality of shifts of a first current staffing schedule will experience the greatest amount of decrease in utilization of its SRUs by the addition of an SRU to that shift; and (ii) tentatively adding an SRU to the shift determined at the determining step performed on the first current staffing schedule to form a second current staffing schedule.

According to a further aspect of the present invention, there is a method for at least partially determining a final staffing schedule by scheduling a plurality of staffing resource units (SRUs) into a plurality of shifts, the plurality of shifts having a preliminary or current staffing schedule including pluralities of SRUs assigned to the plurality of shifts, respectively. The method includes the following steps: (i) determining, by one or more processors, which shift of the plurality of shifts of a first current staffing schedule will experience the greatest amount of increase in utilization of its SRUs by the removal of an SRU to that shift; and (ii) tentatively subtracting an SRU to the shift determined at the determining step performed on the first current staffing schedule to form a second current staffing schedule.

BRIEF DESCRIPTION OF THE SEVERAL VIEWS OF THE DRAWINGS

FIG. 2 is a schematic view of a computer sub-system (that is, a constituent sub-system of the computer system of FIG. 1) which represents a first embodiment computer system for optimizing staffing levels in a ticketing system according to the present invention.

FIGS. 4A and 4B, taken together, are a flowchart of a process performed by the program of FIG. 3 to optimize staffing levels in a ticketing system.

DETAILED DESCRIPTION

Some embodiments of the present invention are efficient in the number of iterations of computer processing required to identify which staff member (for example, which help desk person) to add or subtract. The DETAILED DESCRIPTION section will be divided into the following sub-sections: (i) The Hardware Environment; (ii) Operation of Embodiment(s) of the Present Invention; and (iii) Further Comments And/ Or Embodiment(s); and (iv) Definitions.

I. The Hardware Environment

Figure 1:
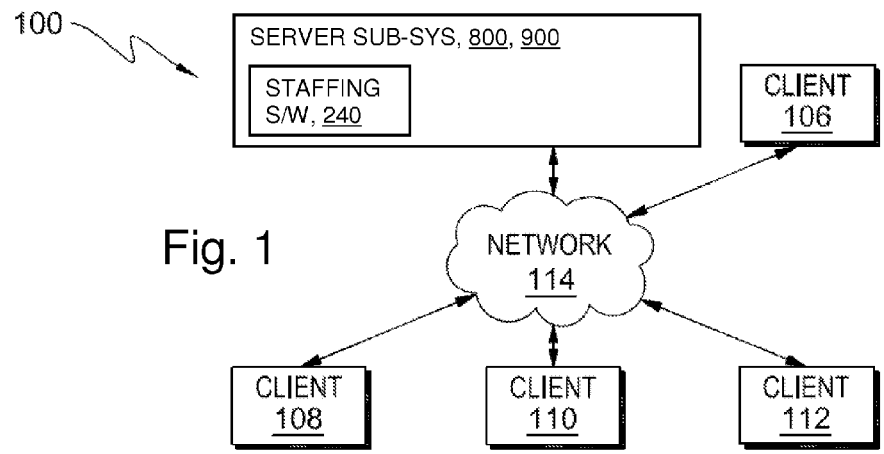
FIG. 1 is a schematic view of a computer system (that is, a system largely made up of computers) in which software and/or methods of the present invention can be used.

As shown in FIG. 1, computer system 100 is a system of network connected computer sub-systems (that is, constituent, network interconnected computer systems that make up larger computer system 100). Computer system 100 includes: server sub-system 800, 900; client sub-systems 106, 108, 110, 112; and communication network 114. As further shown in FIG. 1, server sub-system 800, 900 includes staffing software program (or, simply, staffing software) 240. The staffing software operates to optimize staffing levels in a ticketing system, and will be discussed in great detail, below, in the next sub-section of this DETAILED DESCRIPTION section. While the software program embodiment of the present invention is entirely in the server sub-system in this embodiment, this software could alternatively be located, in whole or in part, in one or more of the client sub-systems 106, 108, 110, 112.

As shown in FIG. 2, server sub-system 800, 900 is a computing/processing device that includes internal components 800 and external components 900. The set of internal components 800 includes one or more processors 820, one or more computer-readable random access memories (RAMs) 822 and one or more computer-readable read-only memories (ROMs 824) on one or more buses 826, one or more operating systems 828 and one or more computer-readable tangible storage devices 830. The one or more operating systems 828 and program 240 (see FIG. 1) are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not transmit a computer program and digital information.

Set of internal components 800 also includes a (read/write) R/W drive or interface 832 to read from and write to one or more portable computer-readable tangible storage devices 936 that can store, but do not transmit, a computer program, such as a CD-ROM, DVD, memory stick, magnetic tape, magnetic disk, optical disk or semiconductor storage device. Program 240 (see FIG. 1) can be stored on one or more of the respective portable computer-readable tangible storage devices 936, read via the respective R/W drive or interface 832 and loaded into the respective hard drive or semiconductor storage device 830.

Set of internal components 800 also includes a network adapter or interface 836 such as a TCP/IP adapter card or wireless communication adapter (such as a 4G wireless communication adapter using OFDMA technology). Program 240 (see FIG. 1) can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Set of external components 900 includes a display screen 920, a keyboard or keypad 930, and a computer mouse or touchpad 934. Sets of internal components 800 also includes device drivers 840 to interface to display screen 920 for imaging, to keyboard or keypad 930, to computer mouse or touchpad 934, and/or to display screen for pressure sensing of alphanumeric character entry and user selections. Device drivers 840, R/W drive or interface 832 and network adapter or interface 836 comprise hardware and software (stored in storage device 830 and/or ROM 824).

Various executable programs (such as program 240, see FIG. 1) can be written in various programming languages (such as Java, C+) including low-level, high-level, object-oriented or non object-oriented languages. Alternatively, the functions of the programs can be implemented in whole or in part by computer circuits and other hardware (not shown).

Figure 3:
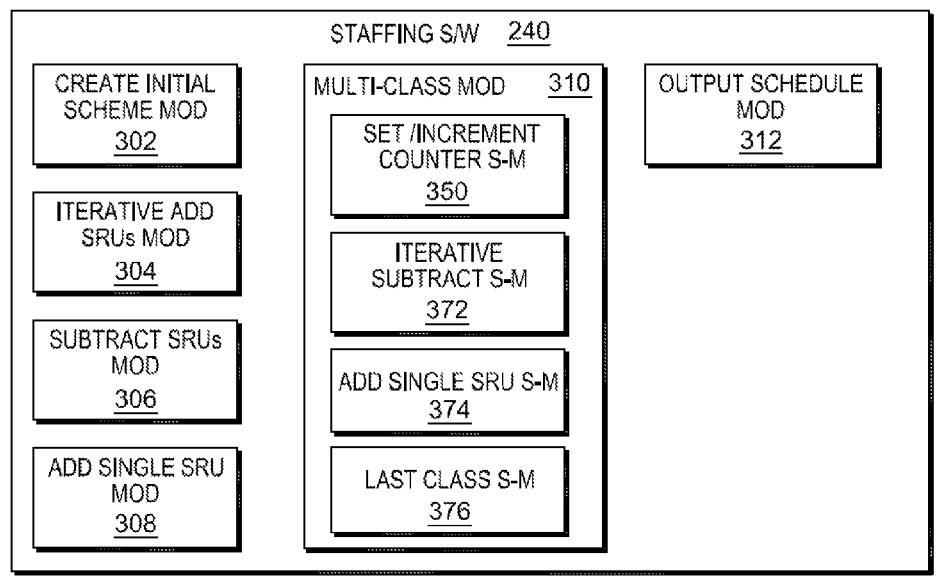
FIG. 3 is a schematic view of a first embodiment of software program for optimizing staffing levels in a ticketing system according to the present invention.

An embodiment of the present invention will now be discussed with reference to the schematic software program diagram of FIG. 3 and the flowchart of FIGS. 4A and 4B. As shown in FIG. 3, staffing software 240 includes: create initial scheme module (mod) 302; iterative add staffing resource units (SRUs) mod 304; subtract SRUs mod 306; add single SRU mod 308; multi-class mod 310; and output schedule mod 312. As further shown in FIG. 3, multi-class mod 310 includes: set/increment counter sub-module (sub-mod) 350; iterative subtract sub-mod 372; add single SRU sub-mod 374; and last class sub-mod 376.

II. Operation of Embodiment(s) of the Present Invention

An embodiment of the present invention will now be discussed with reference to the schematic software program diagram of FIG. 3 and the flowchart of FIGS. 4A and 4B. As shown in FIG. 3, staffing software 240 includes: create initial scheme module (mod) 302; iterative add staffing resource units (SRUs) mod 304; subtract SRUs mod 306; add single SRU mod 308; multi-class mod 310; and output schedule mod 312. As further shown in FIG. 3, multi-class mod 310 includes" set/increment counter sub-module (sub-mod) 350; iterative subtract sub-mod 372; add single SRU sub-mod 374 and last class sub-mod 376.

Turning now to FIG. 4A, FIG. 4A is a portion of a flowchart depicting the operation of staffing software 240 (see FIGS. 1 and 3). At step S401, create initial scheme mod 302 creates an initial staffing scheme. Alternatively, this staffing scheme may be created by a human (in which case mod 302 would receive user input from the human). This initial staffing scheme will not necessarily meet service level agreement SLA targets and/or other prudential rules or guidelines. This initial scheme may well include over-staffed shifts and/or under-staffed shifts. Generally speaking, an objective of the present invention is to refine this scheme into an optimal scheme that: (i) is never under-staffed; and (ii) is over-staffed (from an economic perspective) to the smallest extent possible.

Processing proceeds to step S402 where iterative add SRUs module 304 (see FIG. 3) iteratively adds SRUs within a service class until a "feasible" solution is achieved. The SRUs are added one at a time to whichever shift in the scheduling period is most likely to benefit from an additional SRU in the service class being adjusted. As will be discussed below, one preferred way of determining which shift is most likely to benefit by adding an SRU is to add the SRU to the shift that has the largest utilization decrease. When the appropriate shift is chosen and the iterative SRU addition has been made to that shift, then it is determined whether the new schedule, with the latest iterative SRU addition, is a feasible solution. As will be discussed below in detail, mod 304 determines whether the solution is feasible if at least one of the following conditions exists: (i) all SLA targets are met; or (ii) SLA attainments converge. As will be discussed below, one preferred way of determining whether a given additive iteration represents a "feasible" solution is by using a simulator. If the latest additive iteration does not meet all applicable preconditions for "feasibility" then another iterative addition is made.

When mod 304 determines a "feasible solution" in step S402 processing proceeds to step S403 where mod 306 (see FIG. 3) iteratively subtracts SRUs from the service class being adjusted until an improper condition occurs. Mod 306 subtracts the SRUs one at a time to whichever shift in the scheduling period is likely to be detrimentally affected the least by subtracting an SRU in the service class being adjusted. Mod 306 determines which shift is likely to be least detrimentally affected by an iterative SRU subtraction by subtracting the SRU from the shift that has the smallest utilization decrease. When the appropriate shift is chosen, and the iterative SRU subtraction has been made to that shift, then mod 306 determines whether the new schedule, reflecting the latest iterative SRU subtraction, has caused an improper condition to exist.

One possible improper condition is an unstable system condition. Another possible improper condition is failure to meet and/or converge to SLA targets. Mod 306 checks for both system stability and SLA target attainment/convergence, but other improper condition(s) may be possible depending upon the particular application. It is noted that the use of a simulator may be required for determination of SLA convergence/attainment. On the other hand, the use of a simulator is not generally needed to determine whether the improper condition of an unstable system has been caused by the most recent iterative subtraction of an SRU.

When it has been determined that an improper condition has been caused by the most recent iterative SRU subtraction at step S403, then processing proceeds to step S405. At step S405, add single SRU mod 308 increases, by a single SRU, the staffing in the service class under adjustment. The SRU is added to the shift most likely to benefit from the addition. More specifically, mod 308 determines which shift is most likely to benefit from an added SRU, and proceeds to add the SRU to the shift that has the smallest utilization decrease. Alternatively, there may be other ways of determining which shift is most likely to benefit from the added SRU. After the addition of the SRU at step S405, processing proceeds to process 400*b* shown in FIG. 4B.

As shown in FIG. 4B, at step S439, steps S401 to S405 (see FIG. 4A) are repeated for each of the remaining service classes for which staffing is being determined. At step S439, mods 304, 306, 308 (see FIG. 3) work together to determine each service class in isolation, and independently of the other service classes.

After step S439, processing proceeds to step S440 where set/increment counter sub-mod 350 (see FIG. 3) sets service class counter to its initial value of 1, with 1 representing the most highly skilled service class of n service classes. As shown in FIG. 4B, at steps S441 and S445, sub-mod 350 increments the counter from 2 (at the initial pass) to n (over subsequent passes), with each service class 2 to n potentially being adjusted for "swing" according to steps S442 and S444.

At step S442, iterative subtract sub-mod 372 iteratively subtracts SRUs from the service class (that is, the service class currently designated by the service class counter) until an improper condition occurs. However, unlike the iterative subtraction previously performed for the service class at step S403, SRUs scheduled from higher (that is, smaller "i" value) service classes are considered (in addition to the service class being adjusted) in determining whether an improper condition has occurred. The inclusion of consideration of these higher service classes may prevent an improper condition from occurring in some cases where the improper condition would otherwise occur simply by considering the service class independently from other service classes. These swing adjustments are permissible in this embodiment of the present invention because the service classes are set up so that an SRU of one service class is considered as ready, willing and able to perform the duties of relatively lower service class SRUs. This may not be true in all embodiments, and, in still other embodiments, there may be more complex rules governing what service classes are permitted to handle functions for other classes.

When an improper condition is determined at step S442, processing proceeds to step S444, where add single SRU sub-mod 374 (see FIG. 3) adds a single SRU in the current service class (that is, the service class corresponding to the current "i" value) at the shift most likely to benefit from such addition. More specifically sub-mod 374 determines which shift has the smallest utilization decrease and proceeds to add to the shift. Alternatively, there may be other ways of determining what shift is most likely to benefit by the added SRU of step S444. After the addition is made, then processing proceeds to step S445, where last class sub-mod 376 determines whether processing has been performed for all classes. After all service classes, 2 to n, have been adjusted, the optimal staffing solution has been obtained and processing proceeds to step S446 (see FIG. 4B) and, then, to step S406 (see FIG. 4A).

Figure 5:
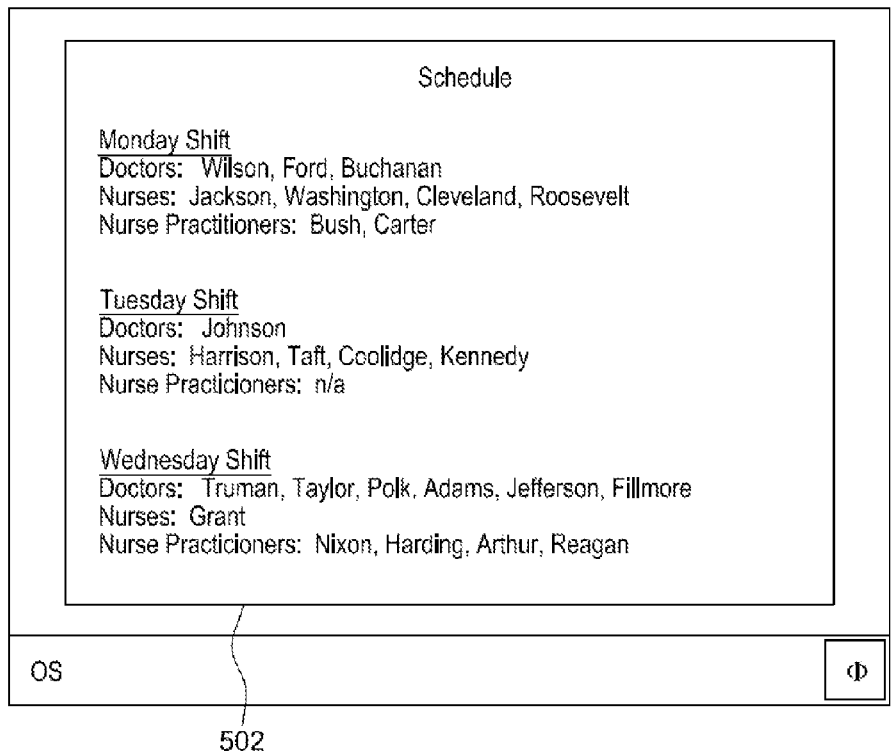
FIG. 5 is a screenshot view of a screenshot generated by the program of FIG. 3 and showing a shift schedule as optimized according to the present invention.

As shown in FIG. 4A, at step S406, output schedule mod 312 outputs the optimal solution, as determined by process 400*a* (for example, saved to a file, displayed to a user's screen, sent as an email, printed out as hard copy, populated into a spreadsheet, etc.). For example, FIG. 5 shows screenshot 500 including window display 502. Window display 502 shows a schedule for three shifts, where each shift has three service classes (doctor (i=1), nurse (i=2) and nurse practitioner (i=3)). Alternatively, in a computer or application help desk environment, there can be three levels of service providers with successively greater skills in solving help desk problems.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

III. Further Comments and/or Embodiment(S)

Figure 6:
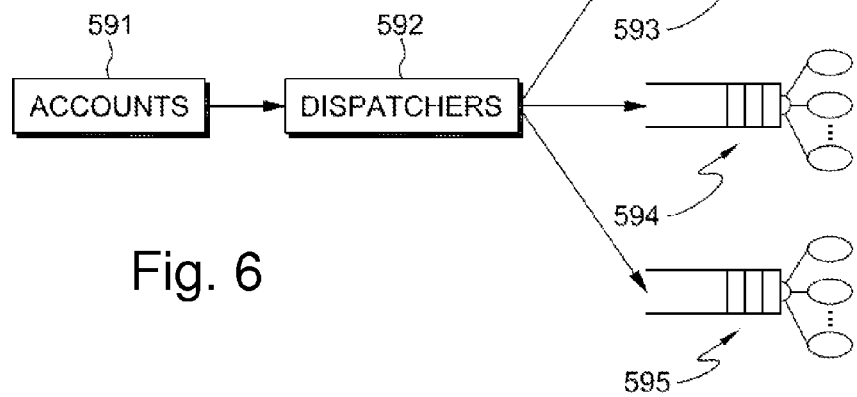
FIG. 6 is a diagram helpful in explaining staffing optimization according to the present invention.
Figure 7A:
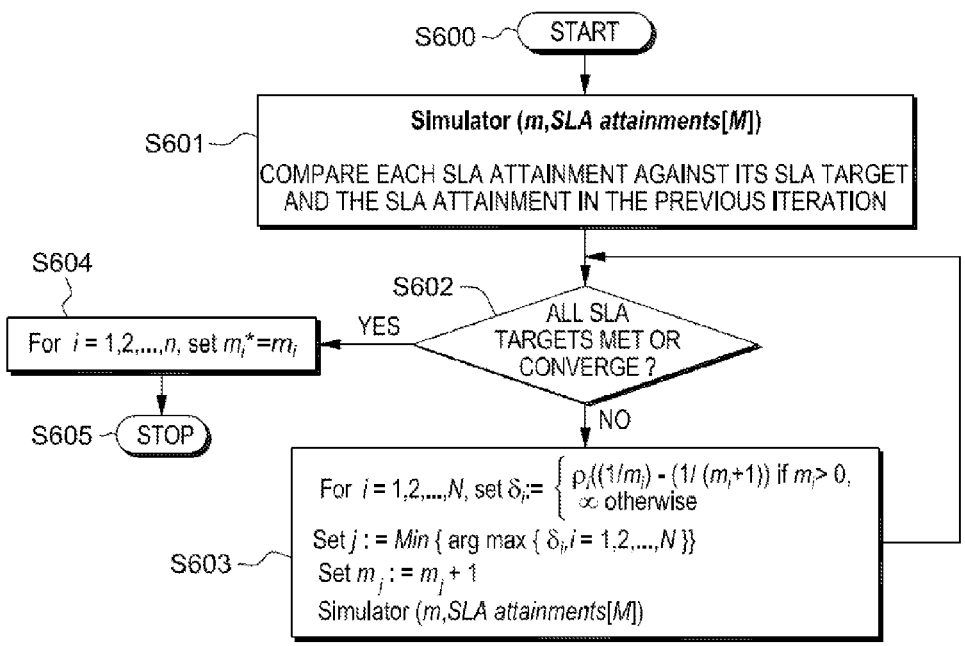
FIGS. 7A, 7B, 7C and 8, taken together, are a flowchart of a process performed by a second embodiment of a program of FIG. 3 to optimize staffing levels in a ticketing system according to the present invention.
Figure 7B:
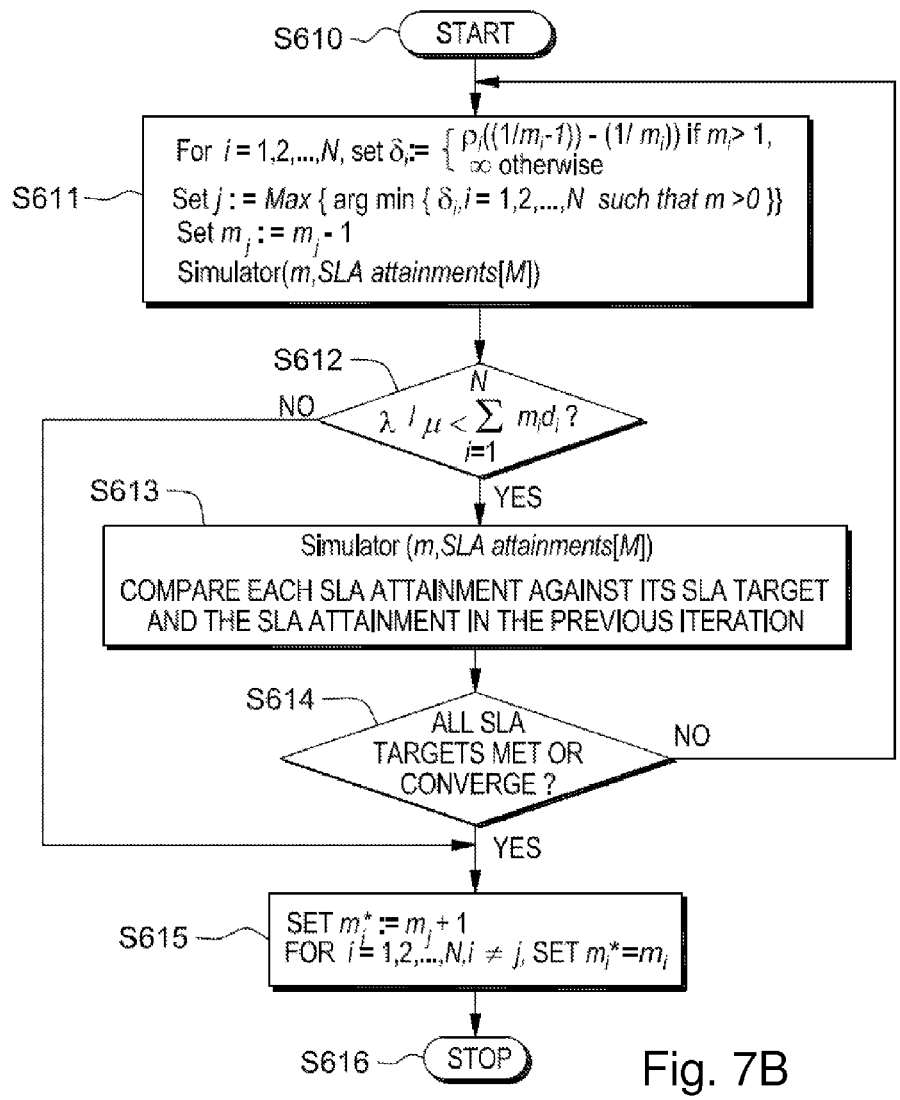
Figure 7C:
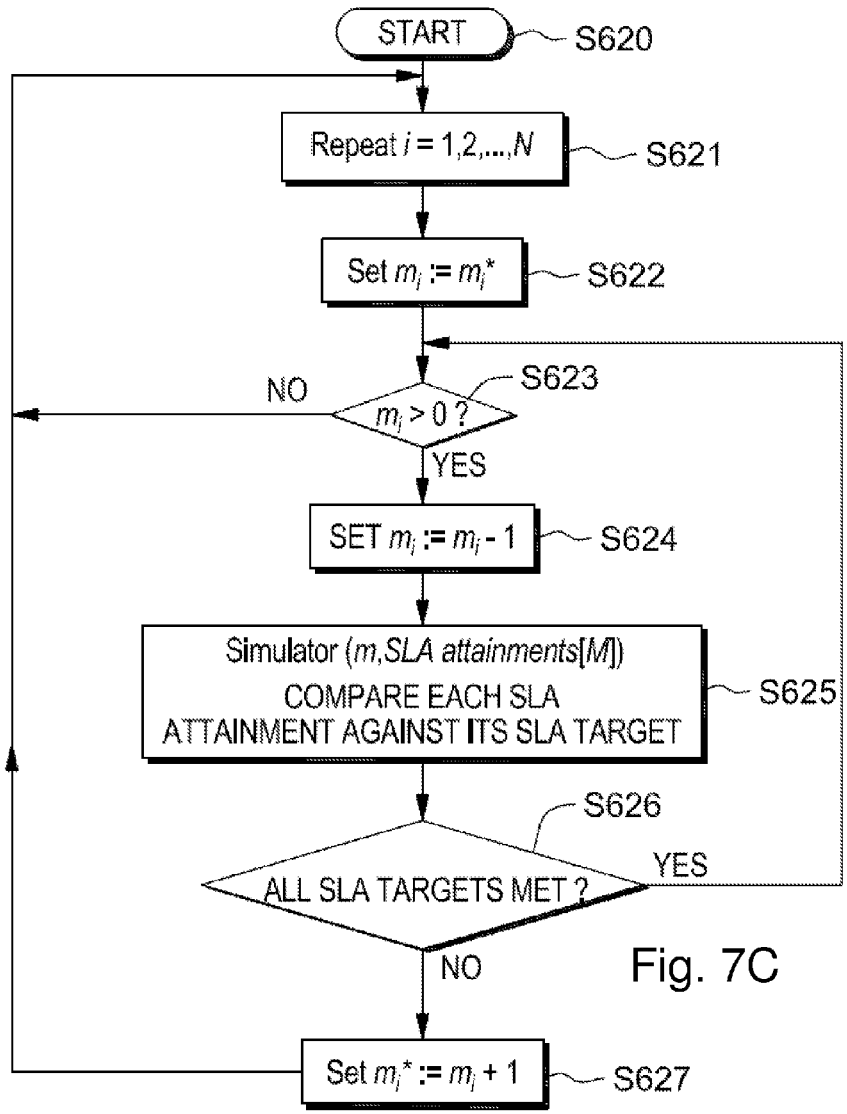
Figure 8:
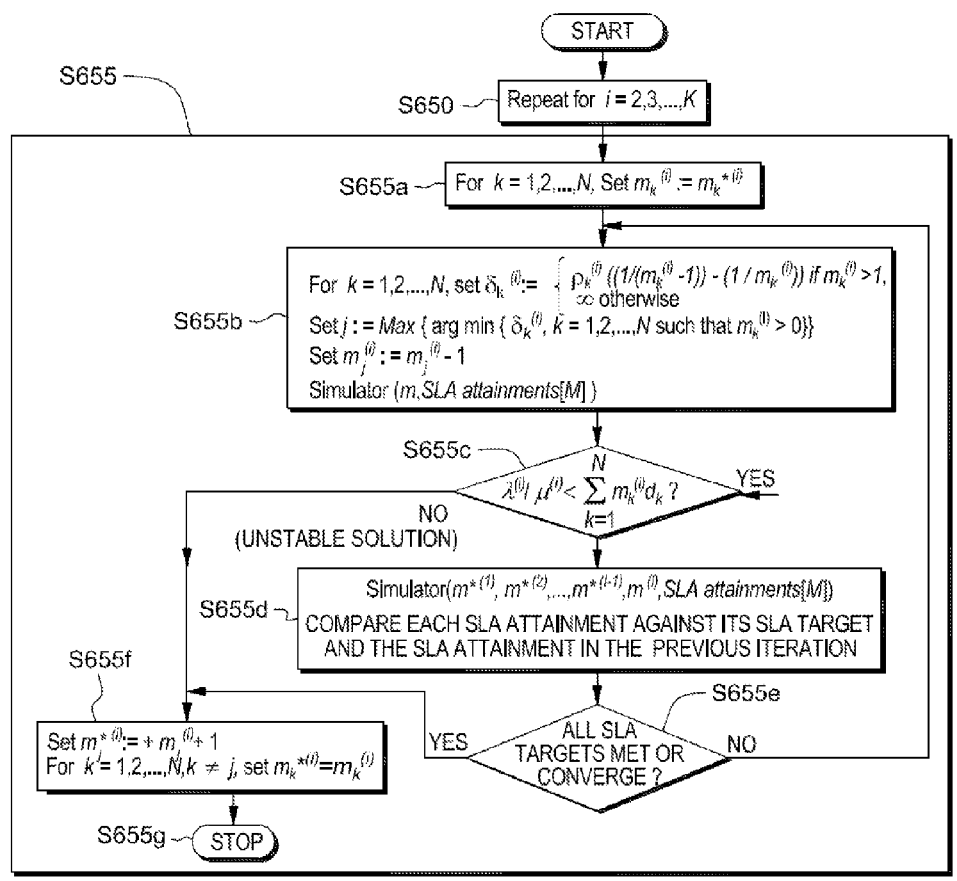

Now that a relatively simple embodiment of the invention has been discussed, a deeper discussion and additional embodiment will now be presented, with reference to FIGS. 6 to 8 and Tables 1 to 14.

In this embodiment of the invention, two types of tickets are considered: (i) those associated with account Service Level Agreement (SLA) targets; and (ii) those that are not. This embodiment includes a new initial solution for the optimization mechanism. In this embodiment, SLA compliance is tested at each iteration of the optimization mechanism. In this way, SLA target attainment for each account will either be met or will converge to a "limit attainment." As will be apparent in the following discussion, this embodiment may involve achievement of many benefits. This embodiment is believed to include a Proof of Concept that demonstrates validity of the optimization mechanism.

This embodiment involves a method for optimizing staffing levels in a ticketing service system using simulation. A ticketing service system may be considered in which incoming tickets are classified based on service complexities. For each service complexity, a pool of resources with the proper skills to serve the tickets may be used. A resource from the pool of resources with skills in a given complexity class of service may also serve other classes of service with lower complexity. A queuing model may be used for allocating a queue for each service complexity class. The queuing model parameters correspond to at least one of the following: (i) a ticket arrival process, (ii) a ticket service time process, and (iii) pool operations. The pool operations typically include: (i) dispatching policies between the various queues; (ii) swinging resources between the various queues; (iii) shift schedules; and/or (iv) official breaks for the resources. Queues may not be analyzed independently of each other because the pool dispatcher may temporarily move a resource from one queue to serve another queue with lower complexity of service, if the length of the latter queue reaches a certain threshold.

An optimization mechanism may be used to determine the minimal number of pool resources required for each skill level per shift schedule. Two types of tickets are considered: (i) those associated with resolution time Service Level Agreements (SLA); and (ii) those that are not. The minimum number of pool resources is determined to meet both of: (i) the offered load demand of all incoming tickets; and (ii) SLA targets associated with type (i) tickets. Simulation may be used to obtain accurate estimates.

In one variation on the embodiment now under discussion, the optimization mechanism may be used for fixing a single service class. The optimization mechanism may fix the single service class by determining a lower bound for the optimal number of resources to be allocated for the single service class for each shift schedule. The lower bound for the optimal number of resources for the single service class is determined based on the following: (i) ticket arrival rate, (ii) ticket service rate, and (iii) pool resources work schedule. The optimization mechanism: (i) is used for developing a process that efficiently searches for an optimal allocation per shift starting from the lower bounds; and (ii) iteratively invokes a simulator.

In another variation on the embodiment now under discussion, the optimal solution obtained for each single service class by the optimization mechanism is used and effects of shifting resources from higher level service class queues to lower level service class queues are considered. Thereafter, a search mechanism is developed that uses individual optimal allocations for each service class obtained and iteratively invokes the simulator. The search mechanism is developed to find an optimal solution when the tickets of all service classes are combined into one single stream.

The embodiment now under discussion may exhibit one or more of the following benefits, advantages and/or objectives:

1. Uses the knowledge of minimal staffing to start the search—this entails: (i) the search is starting with a stable solution and thus all subsequent constructed solutions will be stable, and (ii) the search space is reduced;

2. The search mechanism is based on SLA attainment convergence rather than a pre-specified maximum number of iterations;

3. Above-mentioned items (1) and (2) ensure solution repeatability;

4. The search time to find an optimal solution is reduced significantly particularly for pools having a large number of shifts and/or a large number of staff;

5. The method improves solution quality for a proper skill mix in particular and a proper shift structure.

For each service class, a necessary condition for system stability is that the average arrival rate of tickets should not exceed the system capacity to serve the tickets. The stability equation for this system is given by:

$$\lambda < \mu \times \left( \sum_{i=1}^{N} m_i d_i \right) \times \mathit{eff} \qquad (1)$$

The objective cost function accordingly is given by:

$$\begin{cases} \text{Minimize} \sum_{i=1}^{N} m_i \\ \text{subject to } \mu \left( \sum_{i=1}^{N} m_i d_i \right) \times \mathit{eff} > \lambda \end{cases} \qquad (2)$$

where: N=number of shifts, eff=Staff efficiency (a factor less than 100%–proportion of time during the scheduled time the pool resources work–pool resources take breaks and don't work all the time), $\lambda$=weekly average arrival rate of tickets for the service class, $\mu$=hourly average service rate of tickets for that service class, $m_i$=number of service agents for that service class during shift schedule, and $d_i$=weekly duration of shift schedule Now defined are the following variables used in the construction of an initial solution presented in equation (3) below.

$\lambda_i$: Weekly average arrival rate of tickets in shift i
$\rho_i = \lambda_i/\mu$: Offered load in shift i $$\rho = \lambda/\mu = \sum_{i=1}^{N} \rho_i:$$

Total offered load
$d_{max} = \max\{d_1, d_2, \ldots, d_N\}$

In this embodiment now under discussion, the choice of the initial solution to be used in the optimization mechanism is critical to ensure stability and rapid convergence to an optimal solution. There are many solutions to equation (2). The choice of a solution in proportion to the workload in each shift is given below in equation (3).

$$m_i = \begin{cases} \left\lceil \frac{m \rho_i}{\rho} \right\rceil & \text{if } i = 1 \\ \left\lceil \frac{\left(m - \sum_{j=1}^{i-1} m_j\right) \rho_i}{\sum_{j=i}^{N} \rho_j} \right\rceil & \text{if } i = 2, 3, \ldots, N \end{cases} \qquad (3)$$

where $$m = \left\lceil \frac{\rho}{d_{max} \times \mathit{eff}} \right\rceil$$

The lower bound obtained using equation (3) is used as an initial solution in the optimization mechanism.

Initially, the method starts the search of an optimal solution with a stable solution. The first step is to find the smallest feasible solution based on the initial solution. While searching for such a feasible solution, the method keeps increasing the pool staffing in contrast to randomly generating resource allocations per shift until the SLA targets are either met or converge.

The SLA attainment for each account depends on three variables: (i) the service time of a ticket, (ii) the waiting time of a ticket in the queue, and (iii) the predefined account SLA target time. In the absence of queuing, the maximum attainable SLA is limited by the service time distribution of tickets and the SLA predefined target time. Hence if the account SLA target attainment is greater than the maximum achievable SLA attainment, no feasible solution exists. In such a case, the search mechanism is extended as follows to provide the closest possible feasible solution that meets SLA performance. At each iteration of the search mechanism, the SLA attainment is first compared against the predefined SLA target. If the SLA attainment is smaller, then it is compared against the SLA of the previous iteration. If there is no change (within confidence limit bounds), the SLA attainment has then converged to a limiting SLA. The search mechanism stops when for each account either the SLA target attainment is met or exclusively the SLA attainment converges to a limit.

As a result of increasing the pool staffing any constructed solution may be considered stable. At each iteration step, the staffing allocation of one shift is increased while keeping the staffing allocations of all other shifts constant. The method selects the shift that yields the maximum utilization decrease. The maximum utilization decrease yields to the maximum increase of each SLA attainment average over all shifts. In this case, if the SLA targets do not meet with this shift selection, then they do not meet with any other shift selection because a smaller utilization decrease will result in one of a lower and same SLA attainment.

After finding the optimal solution, the method moves downwards to find the smallest feasible solution. Moving downwards correspond to decreasing the pool staffing while checking whether all SLAs are met. The method keeps track of the last feasible solution found. However, the method checks that the constructed solution is stable before simulating it. The method stops the search at the first constructed solution that is unstable, or at the last feasible solution that didn't meet the SLAs. At each iteration step, moving downwards consists of decreasing the staffing allocation of one shift while keeping the staffing allocations of all other shifts unchanged. The method then selects the shift that yields minimum utilization decrease. The minimum utilization decrease yields to the minimum increase of each SLA attainment averaged over all shifts. If the SLA targets are met with this shift selection, then they will be met with any other shift selection because a greater utilization decrease will result in a higher or same SLA attainment.

FIG. 6 illustrates the components 590 of the above-discussed method including: accounts block 591; dispatchers block 592; service class one block 593; service class two block 594; and service class three block 595. As shown in FIG. 6, the left most block represents Accounts, the block on right represents the dispatcher and the dispatcher is then connected to multiple service classes. In FIGS. 6 to 8, the following variables are defined as follows:

$\lambda_i$=Weekly average arrival rate of tickets in shift i;
$\rho_i=\lambda_i/\mu$: Offered load in shift i;
M=Number of accounts;
$m=(m_1,m_2,\ldots,m_N)$ is the allocation of resources per shift; and
$m^*=(m_1^*,m_2^*,\ldots,m_N^*)$ is the minimal allocation of resources per shift found by the method.

FIG. 7A, FIG. 7B and FIG. 7C illustrate flow diagrams of finding the feasible solution by using the optimization mechanism. The flow diagram of FIG. 7A (including steps S600, S601, S602, S603, S604 and S605) is used for finding a feasible solution for a single class. As shown in FIG. 7A, the simulator is used to compare each SLA attainment against its SLA target. The flow diagram of FIG. 7B (including steps S610, S611, S612, S613, S614, S615 and S616) is used for finding the optimal solution by minimizing the feasible solution.

The process of FIG. 7C includes steps S620, S621, S622, S623, S624, S625, S626 and S627. The process shown in FIG. 7C is used to cover the case when the arrival patterns across the shifts are not homogeneous. For example, it is possible that two (2) customers have non-zero arrivals in two (2) different shifts. Customer A may have a high workload volume average in Shift 1 with a mild SLA attainment and a zero workload volume average in Shift 2, while Customer B may have a low workload volume average in Shift 2 with an aggressive SLA and a zero workload volume average in Shift 1. For such a case, optimization over the workload shifts as in the above method may not lead to an optimal solution. This final step corrects this scenario by optimizing over each shift.

In yet another variation on the embodiment under discussion, a recursive approach for finding the optimal solution may be considered. This is shown in the flowchart of FIG. 8 which includes steps S650 and step S655. As shown in FIG. 8, step S655 includes sub-steps S655a to S655g. In this approach, K service classes are assumed. According to the pool operations, the dispatcher swings an available resource from any service class queue to serve a queue with lower service complexity if the number of tickets at the latter queue exceeds a certain threshold. In a combined stream of incoming tickets requiring different levels of service, it is then possible that the optimal number of resources to be allocated for a service class with lower complexity may be smaller than the one calculated with a single stream of incoming tickets. The single stream of incoming tickets requires the same complexity level of service.

Therefore, for service class i>1, all incoming tickets requiring a service level of complexity less than or equal to i are combined to methodically determine the optimal number of resources to serve the queue with service level of complexity. For I values between 1 and K (inclusive), the optimal resource allocation for an incoming stream of tickets requiring a service level of complexity is considered and illustrated in FIG. 8. Thus, the method and system of this embodiment under discussion provides an effective way of optimizing staffing levels in a ticketing service system using a simulator.

Now a "Proof Of Concept" for the embodiment under discussion will be presented in connection with Tables 1 to 14. A Proof of Concept using 3 service classes was developed and applied to 4 different pools with real data previously analyzed using a different optimization search mechanism. The 3 different service classes from the highest skill level to the lowest follow the nomenclature:
Service class 1: Jazz
Service class 2: Blues
Service class 3: Rhythm Step-by-step Implementation Overview will now be discussed. An automated procedure in Microsoft Excel with manual invocation to the Simulator at each iteration of the Optimization mechanism was performed as follows:

1. Calculation of the weekly average arrival rate of tickets per shift for each service class. A particular procedure was developed to take into account overlapping shifts in order to calculate the ticket arrival rate during each shift.

2. Calculation of the initial solution using equation (3) for each service class
3. Application of the search mechanism as depicted in FIG. 7A for each service class.
4. Application of the search mechanism as depicted in FIG. 7B for each service class.
5. Application of the search mechanism as depicted in FIG. 8 when all service class ticket streams are merged.

For each service class, there were no more than 5 iterations of the respective processes of FIGS. 7A, 7B and 7C of the optimization search before the SLA target attainments were achieved. From the simplest to the most complex pool, the search time varies in the range 2.5 to 10 minutes for the runtime of the simulation step.

The Summary of Results of the Proof Of Concept is as follows:

(A) Pool 1: Current staffing: 4 Rhythm, 9 Blues, 21 Jazz, 13 shifts, mixed ticket work (Rhythm, Blues, Jazz) and 3 accounts.
 (i) Single service class mechanism produced: 8 Rhythm, 11 Blues, 14 Jazz.
 (ii) Multi-service class mechanism (Blues and Jazz) produced: 9 Blues.
 (iii) Multi-service class mechanism (Rhythm, Blues and Jazz) produced: 8 Rhythm
 (iv) Final total staffing from this method: 31.
 (v) Current method recommended a solution of 31 service agents (SA) (6 hours of system time using the previous optimization/simulation approach).

(B) Pool 2: Current Staffing: 10 Rhythm, 7 Blues, 11 Jazz, 4 shifts, mixed ticket work and 3 accounts.
 (i) Single service class mechanism produced: 10 Rhythm, 7 Blues, 11 Jazz,
 (ii) Multi-service class mechanism (Blues and Jazz) produced: 7 Blues.
 (iii) Multi-service class mechanism (Rhythm, Blues and Jazz) produced: 10 Rhythm.
 (iv) Final total staffing from this method: 28.
 (v) Current method recommended a solution of 28 SAs (4 hours of system time using the previous approach).

(C) Pool 3: Current staffing: 5 Rhythm, 5 Blues, 2 Jazz, 7 shifts, mixed ticket work and 3 accounts.
 (i) Single service class mechanism produced: 4 Rhythm, 4 Blues, 6 Jazz.
 (ii) Multi-service class mechanism (Blues and Jazz) produced: 4 Blues.
 (iii) Multi-service class mechanism (Rhythm, Blues and Jazz) produced: 4 Rhythm.
 (iv) Final total staffing from this method: 14.
 (v) Current method recommended a solution of 12 SAs (1 hour of system time).

(D) Pool 4: Current staffing: 55 Rhythm, 20 shifts, mixed ticket work and 1 account.
 (i) Single service class mechanism produced: 53 SAs.
 (ii) Current method recommended a solution of 53 SAs (24 hours of simulation time).

Now Pool 1 Step-by-step Optimization Mechanism Implementation will be discussed. As shown in Table 1 (below), the pool has 3 accounts with the SLA attainment percentages by ticket severity.

As shown in Tables 2 and 3 (below), the pool has 13 shifts with the number of associated SAs (service accounts) by service class (R=Rhythm, B=Blues and J=Jazz) as shown in Table 2.

Calculation of the weekly average ticket arrival rate per shift and per service class will now be discussed. For each of the 3 accounts and for each hour of the week—Monday hour number 0 to Sunday hour number 23—there is an average arrival inter-arrival time between tickets. Using this information and the definition of the shift schedules in Table 1, the weekly average arrival rate per shift is calculated. When two or more shifts overlap in the same hour, the average number of tickets arriving within that hour may be split evenly amongst the shifts. Also, if there is no coverage during off shift hours, incoming tickets during those hours are added to the scheduled shift starting at the earliest time. The average arrival ticket rates per shift and per service class are shown in Table 4 (below).

Calculation of the initial solution will now be discussed. For each service class, the initial solution is calculated using equation (3), the weekly average ticket rate per shift given by Tables 2 and 3 (below), the maximum shift duration of 45 hours/week (see Table 1), a staff efficiency of 83% and the given pool average ticket service rates as shown in Tables 5 and 6 (below).

For each service class, now will be discussed: (i) application of the process FIG. 2A; and (ii) the process of FIG. 2B. For service class "Rhythm," the results of the process of FIG. 2A is shown in Table 7 (below). As shown in Table 7, SLA Sev1 (2) refers to Account 2's SLA for Severity 1 tickets. At iteration 2 of Table 7, the SLAs are met. For service class "Rhythm," the results of the process of FIG. 2B is shown in Table 8 (below). At iteration 1 of Table 8, at least 1 SLA attainment decreased below target which caused optimization to stop.

For service class "Blues," the process of FIG. 2A is shown at Table 9 (below). In Table 9, at iteration 3, the SLAs converged. Regarding the asterisked item in Table 9, a note on Maximum theoretical SLA attainments will now be set forth. The maximum theoretical SLA attainments are not used in the optimization mechanism and are shown to illustrate the SLA attainments limits. The maximum theoretical SLA attainments are calculated using the cumulative probability distribution function of the service time and the SLA target times. For service class "Blues," the process of FIG. 2B is shown at Table 10 (below). At iteration 1 of Table 10, at least 1 SLA attainment decreased below target, causing optimization to stop.

For service class "Jazz," the process of FIG. 2A is shown at Table 11 (below). In Table 11, at iteration 2, the SLAs met or converged. For service class "Jazz," the process of FIG. 2B is shown at Table 12 (below). At iteration 1 of Table 12 it was determined that there was an unstable solution, causing the optimization to stop at this iteration.

Table 13 (below) shows the results of performing the process of FIG. 2C on the following service classes: Blues and Jazz Mix. At iteration 3 it was determined that an unstable solution had occurred.

Table 14 (below) shows the results of performing the process of FIG. 2C on the following service classes: Rhythm, Blues and Jazz Mix. At iteration 2 of Table 14, it was determined that at least 1 SLA decreased, causing the optimization to stop. In Table 14, the minimal solution for best SLA performance is shown by the table entries that are asterisked.

TABLE 1

|  | Account 1 | Account 2 | Account 3 |
| --- | --- | --- | --- |
| Sev 1 Attainment Percent | 97.5 | 95 | 90 |
| Sev 2 Attainment Percent | 95 | 95 | 90 |
| Sev 3 Attainment Percent | 90 | 95 | 90 |
| Sev 4 Attainment Percent | 90 | 95 | 90 |

TABLE 2

|         | MON | TUE | WED | THU | FRI | SAT | SUN | R | B | J  | TOTAL |
|---------|-----|-----|-----|-----|-----|-----|-----|---|---|----|-------|
| Shift 1 | 6   | 6   | 6   | 6   | 6   |     |     | 0 | 3 | 17 | 20    |
|         | 15  | 15  | 15  | 15  |     |     |     |   |   |    |       |
| Shift 2 |     | 6   | 6   | 6   | 6   | 6   |     | 0 | 1 | 1  | 2     |
|         |     | 15  | 15  | 15  | 15  | 15  |     |   |   |    |       |
| Shift 3 | 6   | 6   | 6   | 6   |     |     | 6   | 0 | 1 | 0  | 1     |
|         | 15  | 15  | 15  | 15  |     |     | 15  |   |   |    |       |
| Shift 4 | 13  | 13  | 13  | 13  | 13  |     |     | 0 | 1 | 1  | 2     |
|         | 22  | 22  | 22  | 22  | 22  |     |     |   |   |    |       |
| Shift 5 |     | 13  | 13  | 13  | 13  | 13  |     | 0 | 1 | 0  | 1     |
|         |     | 22  | 22  | 22  | 22  | 22  |     |   |   |    |       |
| Shift 6 | 13  | 13  |     |     | 13  | 13  | 13  | 1 | 0 | 0  | 1     |
|         | 22  | 22  |     |     | 22  | 22  | 22  |   |   |    |       |
| Shift 7 | 13  | 13  | 13  | 13  |     |     | 13  | 0 | 1 | 0  | 1     |
|         | 22  | 22  | 22  | 22  |     |     | 22  |   |   |    |       |
| Shift 8 | 21  | 21  |     |     |     | 21  | 21  | 0 | 1 | 0  | 1     |
|         | 8   | 8   |     |     |     | 8   | 8   |   |   |    |       |
| Shift 9 |     | 21  | 21  | 21  | 21  | 21  |     | 1 | 0 | 0  | 1     |
|         |     | 8   | 8   | 8   | 8   | 8   |     |   |   |    |       |

TABLE 3

|          | MON | TUE | WED | THU | FRI | SAT | SUN | R | B | J | TOTAL |
|----------|-----|-----|-----|-----|-----|-----|-----|---|---|---|-------|
| Shift 10 | 21  | 21  | 21  | 21  | 6   |     |     | 1 | 0 | 0 | 1     |
|          | 8   | 8   | 8   | 8   |     |     |     |   |   |   |       |
| Shift 11 |     | 21  | 21  | 21  | 21  |     |     | 0 | 0 | 1 | 1     |
|          |     | 8   | 8   | 8   | 8   |     |     |   |   |   |       |
| Shift 12 | 21  | 21  | 21  |     |     |     | 21  | 0 | 0 | 1 | 1     |
|          | 8   | 8   | 8   |     |     |     | 8   |   |   |   |       |
| Shift 13 | 21  | 21  |     |     | 21  | 21  | 21  | 1 | 0 | 0 | 1     |
|          | 8   | 8   |     |     | 8   | 8   | 8   |   |   |   |       |
| TOTAL    |     |     |     |     |     |     |     | 4 | 9 | 21 | 34   |

TABLE 4

|   | S1    | S2    | S3    | S4    | S5    | S6    | S7    | S8    | S9    | S10   | S11   | S12   | S13   | Total  |
|---|-------|-------|-------|-------|-------|-------|-------|-------|-------|-------|-------|-------|-------|--------|
| R | 26.37 | 34.31 | 34.31 | 18.33 | 18.33 | 18.33 | 18.33 | 15.40 | 15.40 | 15.40 | 15.40 | 15.40 | 15.40 | 260.71 |
| B | 29.86 | 40.64 | 40.64 | 22.20 | 22.20 | 22.20 | 22.20 | 16.15 | 16.15 | 16.15 | 16.15 | 16.15 | 16.15 | 296.86 |
| J | 48.73 | 61.91 | 61.91 | 32.65 | 32.65 | 32.65 | 32.65 | 29.59 | 29.59 | 29.59 | 29.59 | 29.59 | 29.59 | 480.71 |

TABLE 5

| Service Class | Average Service Rate (tickets/hour) |
|---------------|-------------------------------------|
| R             | 0.99                                |
| B             | 0.93                                |
| J             | 0.95                                |

TABLE 6

|   | S1 | S2 | S3 | S4 | S5 | S6 | S7 | S8 | S9 | S10 | S11 | S12 | S13 | Total |
|---|----|----|----|----|----|----|----|----|----|-----|-----|-----|-----|-------|
| R | 1  | 1  | 1  | 1  | 1  | 0  | 0  | 1  | 1  | 0   | 0   | 0   | 0   | 7     |
| B | 1  | 1  | 1  | 1  | 1  | 1  | 0  | 1  | 1  | 0   | 0   | 1   | 0   | 9     |
| J | 1  | 2  | 2  | 1  | 1  | 1  | 1  | 1  | 1  | 1   | 1   | 0   | 1   | 14    |

TABLE 7

Rhythm Step 1

| | Initial solution - Iteration 1 | Delta calculation | Iteration 2 |
|---|---|---|---|
| Shift1 | 1 | 13.1835684 | 1 |
| Shift2 | 1 | 17.15633303 | 1 |
| Shift3 | 1 | 17.15633303 | 1 |
| Shift4 | 1 | 9.166596845 | 1 |
| Shift5 | 1 | 9.166596845 | 1 |
| Shift6 | 0 | 9999 | 1 |
| Shift7 | 0 | 9999 | 0 |
| Shift8 | 1 | 7.699027013 | 1 |
| Shift9 | 1 | 7.699027013 | 1 |
| Shift10 | 0 | 9999 | 0 |
| Shift11 | 0 | 9999 | 0 |
| Shift12 | 0 | 9999 | 0 |
| Shift13 | 0 | 9999 | 0 |
| | 7 | Max = 9999 | 8 |

| Required SLA performance | Actual Attained | | Actual Attained |
|---|---|---|---|
| SLA Sev1 (1) - 98.5% | 100 | | 100 |
| SLA Sev2 (1) - 95% | 100 | | 100 |
| SLA Sev2 (2) - 97% | 96 | | 99 |
| SLA Sev3 (1) - 90% | 100 | | 100 |
| SLA Sev3 (2) - 95% | 100 | | 100 |
| SLA Sev3 (3) - 90% | 100 | | 100 |
| SLA Sev4 (1) - 90% | 100 | | 100 |
| SLA Sev4 (2) - 95% | 100 | | 100 |
| SLA Sev4 (3) - 90% | 100 | | 100 SLAs are met |

TABLE 8

Rhythm Step 2

| | Initial solution | Delta calculation | Iteration 1 |
|---|---|---|---|
| Shift1 | 1 | 9999 | 1 |
| Shift2 | 1 | 9999 | 1 |
| Shift3 | 1 | 9999 | 1 |
| Shift4 | 1 | 9999 | 1 |
| Shift5 | 1 | 9999 | 1 |
| Shift6 | 1 | 9999 | 1 |
| Shift7 | 0 | 9999 | 0 |
| Shift8 | 1 | 9999 | 1 |
| Shift9 | 1 | 9999 | 0 |
| Shift10 | 0 | 9999 | 0 |
| Shift11 | 0 | 9999 | 0 |
| Shift12 | 0 | 9999 | 0 |
| Shift13 | 0 | 9999 | 0 |
| | 8 | Min = 9999 | 7 |
| SLA Sev1 (1) - 98.5% | 100 | | 100 |
| SLA Sev2 (1) - 95% | 100 | | 100 |
| SLA Sev2 (2) - 97% | 99 | | 95 |
| SLA Sev3 (1) - 90% | 100 | | 100 |
| SLA Sev3 (2) - 95% | 100 | | 100 |
| SLA Sev3 (3) - 90% | 100 | | 100 |
| SLA Sev4 (1) - 90% | 100 | | 100 |
| SLA Sev4 (2) - 95% | 100 | | 100 |
| SLA Sev4 (3) - 90% | 100 | | 100 |

TABLE 9

Blues Step 1

| | Max theoretical SLA attainments - informational only (*) | Initial solution - Iteration 1 | Delta calculation | Iteration 2 | Delta calculation | Iteration 3 |
|---|---|---|---|---|---|---|
| Shift1 | | 1 | 14.93159513 | 1 | 14.931595 | 1 |
| Shift2 | | 1 | 20.32081165 | 1 | 20.320812 | 1 |
| Shift3 | | 1 | 20.32081165 | 1 | 20.320812 | 1 |
| Shift4 | | 1 | 11.09880458 | 1 | 11.098805 | 1 |
| Shift5 | | 1 | 11.09880458 | 1 | 11.098805 | 1 |
| Shift6 | | 1 | 11.09880458 | 1 | 11.098805 | 1 |
| Shift7 | | 0 | 9999 | 1 | 11.098805 | 1 |
| Shift8 | | 1 | 8.076849885 | 1 | 8.0768499 | 1 |
| Shift9 | | 1 | 8.076849885 | 1 | 8.0768499 | 1 |
| Shift10 | | 0 | 9999 | 0 | 9999 | 1 |
| Shift11 | | 0 | 9999 | 0 | 9999 | 0 |
| Shift12 | | 1 | 8.076849885 | 1 | 8.0768499 | 1 |
| Shift13 | | 0 | 9999 | 0 | 9999 | 0 |
| | | 9 | Max = 9999 | 10 | 9999 | 11 |
| SLA attainments for accounts (1), (2) and (3) by severity | | | | | | |
| SLA Sev1 (1) - 98.5% | | 98 | | 98 | | 99 |
| SLA Sev2 (1) - 95% | | 100 | | 100 | | 100 |
| SLA Sev2 (2) - 97% | 76 | 74 | | 75 | | 75 |
| SLA Sev2 (3) - 90% | 94 | 93 | | 93 | | 93 |
| SLA Sev3 (1) - 90% | | 100 | | 100 | | 100 |
| SLA Sev3 (2) - 95% | | 100 | | 100 | | 100 |
| SLA Sev3 (3) - 90% | | 100 | | 100 | | 100 |
| SLA Sev4 (1) - 90% | | 100 | | 100 | | 100 |
| SLA Sev4 (2) - 95% | | 100 | | 100 | | 100 |
| SLA Sev4 (3) - 90% | | 100 | | 100 | | 100 |

TABLE 10

| Blues Step 2 | | | |
|---|---|---|---|
| | Initial solution | Delta calculation | Iteration 1 |
| Shift1 | 1 | 9999 | 1 |
| Shift2 | 1 | 9999 | 1 |
| Shift3 | 1 | 9999 | 1 |
| Shift4 | 1 | 9999 | 1 |
| Shift5 | 1 | 9999 | 1 |
| Shift6 | 1 | 9999 | 1 |
| Shift7 | 1 | 9999 | 1 |
| Shift8 | 1 | 9999 | 1 |
| Shift9 | 1 | 9999 | 1 |
| Shift10 | 1 | 9999 | 1 |
| Shift11 | 0 | 9999 | 0 |
| Shift12 | 1 | 9999 | 0 |
| Shift13 | 0 | 9999 | 0 |
| | 11 | Min = 9999 | 10 |
| SLA Sev1 (1) - 98.5% | 99 | | 98 |
| SLA Sev2 (1) - 95% | 100 | | 100 |
| SLA Sev2 (2) - 97% | 74 | | 74 |
| SLA Sev2 (3) - 90% | 93 | | 92 |
| SLA Sev3 (1) - 90% | 100 | | 100 |
| SLA Sev3 (2) - 95% | 100 | | 100 |
| SLA Sev3 (3) - 90% | 100 | | 100 |
| SLA Sev4 (1) - 90% | 100 | | 100 |
| SLA Sev4 (2) - 95% | 100 | | 100 |
| SLA Sev4 (3) - 90% | 100 | | 100 |

TABLE 11

| Jazz Step 1 | | | | |
|---|---|---|---|---|
| | Max theoretical SLA attainments - informational only | Initial solution - Iteration 1 | Delta calculation | Iteration 2 |
| Shift1 | | 1 | 24.36657465 | 1 |
| Shift2 | | 2 | 10.3185089 | 2 |
| Shift3 | | 2 | 10.3185089 | 2 |
| Shift4 | | 1 | 16.32672481 | 1 |
| Shift5 | | 1 | 16.32672481 | 1 |
| Shift6 | | 1 | 16.32672481 | 1 |
| Shift7 | | 1 | 16.32672481 | 1 |
| Shift8 | | 1 | 14.79524754 | 1 |
| Shift9 | | 1 | 14.79524754 | 1 |
| Shift10 | | 1 | 14.79524754 | 1 |
| Shift11 | | 1 | 14.79524754 | 1 |
| Shift12 | | 0 | 9999 | 1 |
| Shift13 | | 1 | 14.79524754 | 1 |
| | | 14 | Max = 9999 | 15 |
| SLA Sev2 (1) - 95% | | 100 | | 100 |
| SLA Sev2 (2) - 97% | 71 | 71 | | 71 |
| SLA Sev3 (1) - 90% | | 100 | | 100 |
| SLA Sev3 (2) - 95% | | 100 | | 100 |
| SLA Sev3 (3) - 90% | | 100 | | 100 |
| SLA Sev4 (1) - 90% | | 100 | | 100 |
| SLA Sev4 (2) - 95% | | 100 | | 100 |
| SLA Sev4 (3) - 90% | | 100 | | 100 |

TABLE 12

| Jazz Step 2 | | | |
|---|---|---|---|
| | Initial solution | Delta calculation | Iteration 1 |
| Shift1 | 1 | 9999 | 1 |
| Shift2 | 2 | 30.95552669 | 1 |
| Shift3 | 2 | 30.95552669 | 2 |
| Shift4 | 1 | 9999 | 1 |
| Shift5 | 1 | 9999 | 1 |
| Shift6 | 1 | 9999 | 1 |
| Shift7 | 1 | 9999 | 1 |
| Shift8 | 1 | 9999 | 1 |
| Shift9 | 1 | 9999 | 1 |
| Shift10 | 1 | 9999 | 1 |
| Shift11 | 1 | 9999 | 1 |
| Shift12 | 0 | 9999 | 0 |
| Shift13 | 1 | 9999 | 1 |
| | 14 | Min = 30.95552669 | 13 |
| SLA Sev2 (1) - 95% | 100 | | |
| SLA Sev2 (2) - 97% | 71 | | |
| SLA Sev3 (1) - 90% | 100 | | |
| SLA Sev3 (2) - 95% | 100 | | |
| SLA Sev3 (3) - 90% | 100 | | |
| SLA Sev4 (1) - 90% | 100 | | |
| SLA Sev4 (2) - 95% | 100 | | |
| SLA Sev4 (3) - 90% | 100 | | |

TABLE 13

Step 3 - Blues and Jazz Mix

| | Jazz staffing-fixed | Initial solution-Blues staffing - Iteration 1 | Delta calculation | Iteration 2 | Delta calculation | Iteration 3 | Delta calculation | Iteration 3 |
|---|---|---|---|---|---|---|---|---|
| Shift1 | 1 | 1 | 9999 | 1 | 9999 | 1 | 9999 | 1 |
| Shift2 | 2 | 1 | 9999 | 1 | 9999 | 1 | 9999 | 1 |
| Shift3 | 2 | 1 | 9999 | 1 | 9999 | 1 | 9999 | 1 |
| Shift4 | 1 | 1 | 9999 | 1 | 9999 | 1 | 9999 | 1 |
| Shift5 | 1 | 1 | 9999 | 1 | 9999 | 1 | 9999 | 1 |
| Shift6 | 1 | 1 | 9999 | 1 | 9999 | 1 | 9999 | 1 |
| Shift7 | 1 | 1 | 9999 | 1 | 9999 | 1 | 9999 | 1 |
| Shift8 | 1 | 1 | 9999 | 1 | 9999 | 1 | 9999 | 1 |
| Shift9 | 1 | 1 | 9999 | 1 | 9999 | 1 | 9999 | 0 |
| Shift10 | 1 | 1 | 9999 | 1 | 9999 | 0 | 9999 | 0 |
| Shift11 | 1 | 0 | 9999 | 0 | 9999 | 0 | 9999 | 0 |
| Shift12 | 0 | 1 | 9999 | 0 | 9999 | 0 | 9999 | 0 |
| Shift13 | 1 | 0 | 9999 | 0 | 9999 | 0 | 9999 | 0 |
| | 14 | 11 | Min = 9999 | 10 | 9999 | 9 | 9999 | 8 |
| SLA Sev1 (1) - 98.5% | | 99 | | 99 | | 99 | | 99 |
| SLA Sev2 (1) - 95% | | 100 | | 100 | | 100 | | 100 |
| SLA Sev2 (2) - 97% | | 75 | | 75 | | 75 | | 73 |
| SLA Sev2 (3) - 90% | | 93 | | 93 | | 93 | | 92 |
| SLA Sev3 (1) - 90% | | 100 | | 100 | | 100 | | 100 |
| SLA Sev3 (2) - 95% | | 100 | | 100 | | 100 | | 100 |
| SLA Sev3 (3) - 90% | | 100 | | 100 | | 100 | | 100 |
| SLA Sev4 (1) - 90% | | 100 | | 100 | | 100 | | 100 |
| SLA Sev4 (2) - 95% | | 100 | | 100 | | 100 | | 100 |
| SLA Sev4 (3) - 90% | | 100 | | 100 | | 100 | | 100 |

TABLE 14

Step 3 - Rhythm, Blues and Jazz Mix

| | Jazz staffing-fixed | Blues staffing-fixed | Initial solution-Rhythm staffing - Iteration 1 | Delta calculation | Iteration 2 |
|---|---|---|---|---|---|
| Shift1 | 1* | 1* | 1* | 9999 | 1 |
| Shift2 | 2* | 1* | 1* | 9999 | 1 |
| Shift3 | 2* | 1* | 1* | 9999 | 1 |
| Shift4 | 1* | 1* | 1* | 9999 | 1 |
| Shift5 | 1* | 1* | 1* | 9999 | 1 |
| Shift6 | 1* | 1* | 1* | 9999 | 1 |
| Shift7 | 1* | 1* | 0* | 9999 | 0 |
| Shift8 | 1* | 1* | 1* | 9999 | 1 |
| Shift9 | 1* | 1* | 1* | 9999 | 0 |
| Shift10 | 1* | 0* | 0* | 9999 | 0 |
| Shift11 | 1* | 0* | 0* | 9999 | 0 |
| Shift12 | 0* | 0* | 0* | 9999 | 0 |
| Shift13 | 1* | 0* | 0* | 9999 | 0 |
| | 14* | 9* | 8* | Min = 9999 | 7 |
| SLA Sev1 (1) - 98.5% | | | 99 | | 99 |
| SLA Sev2 (1) - 95% | | | 100 | | 100 |
| SLA Sev2 (2) - 97% | | | 83 | (Max theoretical SLA attn. 84) | 82 |
| SLA Sev2 (3) - 90% | | | 93 | | 93 |
| SLA Sev3 (1) - 90% | | | 100 | | 100 |
| SLA Sev3 (2) - 95% | | | 100 | | 100 |
| SLA Sev3 (3) - 90% | | | 100 | | 100 |
| SLA Sev4 (1) - 90% | | | 100 | | 100 |
| SLA Sev4 (2) - 95% | | | 100 | | 100 |
| SLA Sev4 (3) - 90% | | | 100 | | 100 |

It is noted that some embodiments of the present invention may have inventive features that effectively limit their use to ticketing system contexts, and that these ticketing system embodiments may not work, or work well, in connection with other types of staffing situations, such as a call center context.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

Staffing resource unit (SRU): includes, but is not necessarily limited to: a single human employee, a single human contractor, a single human volunteer, a group of human employees/contractors, a non-human resource and/or a set of non-human resources.

Human staffing resource unit (HSRU): an SRU in the form of human(s).

What is claimed is:

1. A method for at least partially determining a final staffing schedule by scheduling a plurality of staffing resource units (SRUs) into a plurality of shifts, the plurality of shifts having a preliminary or current staffing schedule including pluralities of SRUs assigned to the plurality of shifts, respectively, the method comprising:
   determining, by a simulator for simulating ticket servicing in a ticketing system, which shift of the plurality of shifts of a first current staffing schedule will experience the greatest amount of decrease in utilization of its SRUs by the addition of an SRU to that shift; and
   tentatively adding an SRU to the shift determined at the determining step performed on the first current staffing schedule to form a second current staffing schedule.

2. The method of claim 1 wherein the shift determined at the determining step is over utilized when the determining step is performed.

3. The method of claim 1 further comprising:
   repeating the determining step and the tentatively adding step until a feasible solution is obtained, so that the determination of a shift by using a greatest amount of decrease in utilization tends to decrease the number of repetitions of the determining step and the tentatively adding step relative to any algorithms that determine a shift by using a shift with the greatest utilization.

4. The method of claim 3 wherein all of the SRUs of the first current and second current staffing schedule are SRUs of an identical class value.

5. The method of claim 3 wherein:
   the SRUs of the first current staffing schedule include SRUs having at least two different class values; and
   the SRUs of the second current staffing schedule include SRUs having at least two different class values.

6. The method of claim 3 wherein:
   the SRUs of the first current staffing schedule include SRUs having n class values, where n is an integer greater than zero; and
   the SRUs of the second current staffing schedule include SRUs having n+1 class values.

7. The method of claim 1 further comprising the steps of:
   determining, by one or more processors, which shift of the plurality of shifts of a third current staffing schedule will experience the greatest amount of increase in utilization of its SRUs by the removal of an SRU to that shift; and
   tentatively subtracting an SRU to the shift determined at the determining step performed on the third current schedule to form a forth current staffing schedule.

8. The method of claim 7 wherein the third and fourth current schedules occur prior to the first and second current schedules.

9. A computer program product comprising one or more computer-readable storage devices and computer-readable program instructions which are stored on the one or more storage devices and, when executed by one or more processors, perform the method of claim 1.

10. A simulator system for at least partially determining a final staffing schedule by scheduling a plurality of staffing resource units (SRUs) into a plurality of shifts, the plurality of shifts having a preliminary or current staffing schedule including pluralities of SRUs assigned to the plurality of shifts, respectively, the computer system comprising:
   one or more processors, one or more computer-readable memories, one or more computer-readable storage devices, and program instructions stored on at least one of the one or more storage devices for execution by at least one of the one or more processors via at least one of the one or more memories, with the processor(s), computer-readable memorie(s), computer-readable storage device(s) and program instructions being structured, connected and/or programmed to form a simulator for simulating ticket servicing in a ticketing system, the program instructions comprising:
   first program instructions to determine which shift of the plurality of shifts of a first current staffing schedule will experience the greatest amount of decrease in utilization of its SRUs by the addition of an SRU to that shift; and
   second program instructions to tentatively add an SRU to the shift determined at the determining step performed on the first current staffing schedule to form a second current staffing schedule.

11. A method for at least partially determining a final staffing schedule by scheduling a plurality of staffing resource units (SRUs) into a plurality of shifts, the plurality of shifts having a preliminary or current staffing schedule including pluralities of SRUs assigned to the plurality of shifts, respectively, the method comprising:
   determining, by a simulator for simulating ticket servicing in a ticketing system, which shift of the plurality of shifts of a first current staffing schedule will experience the greatest amount of increase in utilization of its SRUs by the removal of an SRU to that shift; and
   tentatively subtracting an SRU to the shift determined at the determining step performed on the first current staffing schedule to form a second current staffing schedule.

12. The method of claim 11 wherein the shift determined at the determining step is under utilized when the determining step is performed.

13. The method of claim 11 further comprising:
   repeating the determining step and the tentatively subtracting step until a predetermined improper condition occurs, so that the determination of a shift by using a greatest amount of increase in utilization tends to decrease the number of repetitions of the determining step and the tentatively adding step relative to any algorithms that determine a shift by using a shift with the smallest utilization.

14. The method of claim 13 wherein all of the SRUs of the first current and second current staffing schedule are SRUs of an identical class value.

15. The method of claim 13 wherein:
   the SRUs of the first current staffing schedule include SRUs having at least two different class values; and
   the SRUs of the second current staffing schedule include SRUs having at least two different class values.

16. The method of claim 13 wherein:
- the SRUs of the first current staffing schedule include SRUs having n class values, where n is an integer greater than zero; and
- the SRUs of the second current staffing schedule include SRUs having n−1 class values.

17. A computer program product comprising one or more computer-readable storage devices and computer-readable program instructions which are stored on the one or more storage devices and, when executed by one or more processors, perform the method of claim 11.

* * * * *